United States Patent [19] [11] 4,287,308
Nakayama et al. [45] Sep. 1, 1981

[54] PROCESS FOR PREPARING A THERMO-EXPANDABLE MICROSPHERES

[75] Inventors: Nobukazu Nakayama; Sueo Kida, both of Nara, Japan

[73] Assignee: Matsumoto Yushi-Seiyaku Co., Ltd., Osaka, Japan

[21] Appl. No.: 158,172

[22] Filed: Jun. 10, 1980

[30] Foreign Application Priority Data

Feb. 14, 1980 [JP] Japan .................................. 55/17372

[51] Int. Cl.³ ............................................... C08J 9/36
[52] U.S. Cl. ...................................... 521/53; 521/55; 521/56; 521/145; 521/149
[58] Field of Search ........................... 521/53, 56, 149

[56] References Cited

U.S. PATENT DOCUMENTS 3,615,972  10/1971  Morehouse, Jr. et al. .......... 521/145

Primary Examiner—Morton Foelak
Attorney, Agent, or Firm—Lawrence Rosen

[57] ABSTRACT

Microspheres, the blowing agent of which is microencapsulated with a thermoplastics having an acrylonitrile moiety, are prepared. Acrylonitrile monomer remaining therein is eliminated from the microspheres by cyanoethylation. The microspheres have an excellent solvent-resistance and an expansibility hardly changeable with time but no harmfulness attributed to the acrylonitrile monomer.

5 Claims, No Drawings

PROCESS FOR PREPARING A THERMO-EXPANDABLE MICROSPHERES

DETAILED DESCRIPTION OF INVENTION

The present invention relates to a process for preparing a thermo-expandable microsphere substantially not containing nitrile monomers.

Many methods of preparing thermo-expandable microspheres by encapsulating a blowing agent with a thermoplastic polymer was well known. For example, U.S. Pat. No. 3,615,972 discloses a production of thermo-expandable microspheres in which a monomer having a polymerizable unsaturated bond is polymerized under the presence of a liquid blowing agent to give the thermo-expandable microspheres incorporating the liquid blowing agent therein.

However, the microspheres as produced by the above method contain substantial amount of the free monomer, some of which are harmful to human's health, and the elimination of the monomer has been considered very difficult.

Particularly, nitrile monomers such as acrylonitrile and methacrylonitrile, though being one of the most useful monomers to produce a practical microsphere, are liable to remain in the microsphere, and considered a carcinogenic chemicals.

In order to obtain a thermo-expandable microsphere not containing an unreacted monomer, following methods have been attempted:

(i) Reacting using larger amount of an initiator for longer time to attain a high conversion of the monomers into polymer.

(ii) Washing the produced microsphere with a proper solvent to eliminate the monomer.

(iii) Deairating the produced microsphere under a reduced pressure to eliminate the monomers.

However, a slight effect was obtained only from the method (i), but not from the other methods (ii) and (iii). The reason is interpreted that the most of the unreacted monomers exist in the blowing agent encapsulated with a polymer wall but not on the surface of the polymer wall. Further, not only is the elimination of the monomers by the method (i) insufficient but also it weakens strength of the wall so as to make expansibility of the microsphere lowered with time, and to shorten pot life of the microsphere.

In order to improve the above defects, Japanese Patent Publication (unexamined) No. 163,966/79 proposed that acrylonitrile monomer is perfectly polymerized in a vessel throughly filled with a liquid medium. However, the result is also insufficient.

When a microsphere is produced according to U.S. Pat. No. 3,615,972, the expansibility of the produced microsphere is liable to be lowered with time in general and the solvent resistance of the microsphere delivered from some kinds of monomer is also liable to become poor.

It has been found that a microsphere having an excellent property is obtained using the acrylonitrile of at least 15 percent by weight based on the total weight of an polymerizable unsaturated monomer. The reason is considered that a copolymer having an acrylonitrile moiety has an excellent solvent resistance or forms so tight a wall that the liquid blowing agent hardly permeates the wall.

However, the microsphere obtained by using the acrylonitrile also contains a substantial amount of unreacted acrylonitrile monomer. For example, when 15 percent by weight of the acrylonitrile is used, the unreacted acrylonitrile monomer of about 1,000 ppm remains in the produced microsphere.

As well known, acrylonitrile has been suspected of the materials having a carcinogenecity. Therefore, putting the microsphere containing the acrylonitrile to practical use, the acrylonitrile must be eliminated from the microsphere sufficiently.

As aforementioned, it is very difficult to eliminate the monomers remaining in the microsphere and to perfect the reaction to give the products not containing a substantial amount of the monomer. At the use of acrylonitrile as a monomer, the same problem occures.

It has been found that the acrylonitrile monomer is successfully eliminated from the microsphere by cyanoethylation.

The present invention relates to a process for preparing a thermo-expandable microsphere not containing substantial amount of an acrylonitrile monomer which comprises microencapsulating a blowing agent with a thermoplastic polymer having an acrylonitrile moiety as one of ingredients, wherein the blowing agent becomes gaseous at a temperature below a softening temperature of the thermoplastic polymer, and subjecting the microencapsulated product to cyanoethylation to eliminate the acrylonitrile monomer remaining in the microencapsulated product.

The microencapsulation itself of the present invention may be a conventional one as described in the aforementioned U.S. Pat. No. 3,615,972. For example, the microencapsulation may be accomplished by mixing a monomer having a polymerizable unsaturated bond with a liquid blowing agent and an initiator and emulsion-polymerizing the mixture in an aqueous medium containing a suitable emulsifying or a dispersing agent. In the present invention, the acrylonitrile monomer is an essential ingredient as a monomer having a polymerizable unsaturated bond. Employment of the acrylonitrile prevents deterioration of the thermo-expansibility with change of time and improves the solvent resistance. Such effect is recognized remarkably at the use of about more than 15 percent by weight of the acrylonitrile based on the total amount of monomers as used.

As other suitable monomers which may be used with the acrylonitrile monomer, there are exemplified acrylic acid, methacrylic acid, acrylic acid ester, methacrylic acid ester, styrene, vinyl acetate, vinylidene chloride and the like, but not critical. A cross-linkable monomer such as a vinylbenzene may be used with the above monomer. A particularly preferable thermoplastic polymer as a wall material is obtained by copolymerizing more than 15 percent by weight of acrylonitrile, 30 to 80 percent by weight of vinylidene chloride and a minor amount (e.g. 0.1 to 1.0 percent by weight) of a cross-linkable monomer.

As the blowing agent, a compound becoming or generating a gas below the softening temperature of the thermoplastic polymer may be used. For example, a liquid blowing agent such as propane, propylene, butene, n-butane, iso-butane, iso-pentane, neo-pentane, n-pentane, hexane, heptane, petroleum ether, halogenized methane; methylene chloride, chloro-fluorocarbon such as $CCl_3F$, $CCl_2F_2$ and the like, tetraalkylsilane; such as tetramethylsilane, trimethylethylsilane, and a compound which is pyrolized to generate a gas such as azobisisobutyronitrile may be used. Particularly preferable blowing agent is a liquid blowing agent selected from the group consisting of isobutane, n-butane, pentane, isopentane and pertroleum ether.

The microencapsulation may be carried out according to the method as described in the aforementioned U.S. Pat. No. 3,615,972, and Japanese Patent Publication (unexamined) No. 14,381/74. In order to effect the cyanoethylation successfully, it is preferable to controll the diameter of the microsphere in a range of 1 to 100μ, particularly 3 to 50μ.

A compound available for the cyanoethylation may widely be selected from a group consisting of an amine, amide, alcohol, mercaptan, aldehyde, ketone, ester, inorganic acid and salt of the acid. Examples of such a compound are ammonia, a lower amine (particularly, a primary or secondary amine having a $C_1$–$C_6$ alkyl group or alkylene group such as methylamine, ethylamine, butylamine, ethylenediamine), an alkanolamine (particularly, a primary or secondary alkanolamine such as monoethanolamine, diethanolamine, monopropanolamine, and dipropanolamine), an alkyl alkanolamine such as N-ethyl ethanolamine, N-butyl ethanolamine and an ethylene oxide adduct of polyamine, a hydroxylamine, a cyclic amine such as morpholine, piperidine, piperazine, hydrazine, pyrrole, carbazole, an aliphatic lower alcohol having from one to six carbon atoms such as methanol, ethanol, isopropanol, butanol, polyhydric alcohol such as glycerol, sorbitol, alkylene glycol or polyalkylene glycol (e.g. ethylene glycol, propylene glycol, polyethylene glycol, polypropylene glycol) and alkyl ether thereof, an amide, imide or lactam such as acetamide, urea, succinimide and the like, an aldehyde such as formaldehyde, propylaldehyde, butylaldehyde and the like, and oximes thereof, sulfide such as sodium sulfide, mercaptan such as ethyl mercaptan, butyl mercaptan, an active hydrogen containing compound such as malonic acid ester, acetylacetone and the like. A particularly preferable compound is a primary or secondary lower alkylamine, a primary or secondary alkanolamine, or sodium sulfide. Most preferably, a primary lower amine or a primary alkanolamine is used.

The cyanoethylation according to the present invention may be achieved between a polymerization process and a washing process or after the washing. The cyanoethylation may be carried out in an aqueous medium, and the reacting agent for the cyanoethylation may be used at a concentration of 0.01 to 10 percent preferably 0.1 to 3.0 percent by weight.

When the cyanoethylation is carried out using a lower alkylamine or an alkanolamine, particularly primary amine or a primary alkanolamine, preferable result is obtained, even if at ordinary temperature and at atmospheric pressure. However, more preferable result is obtained conducting the cyanoethylation at a temperature of 30° to 80° C. under a pressure of 2 to 10 $Kg/cm^2$, most preferably at 40° to 80° C. under 4 to 6 $Kg/cm^2$. At the temperature below 30° C., rate of cyanoethylation is lowered, and at more than 80° C., the microsphere is apt to be coagulated. Under the pressure of less than 2 $Kg/cm^2$, the microsphere is apt to be deformed and the rate of the cyanoethylation is lowered. Under more than 10 $Kg/cm^2$, there is a fear of deformation of the microsphere.

The cyanoethylation may be carried out in the presence of an alkaline catalyst such as sodium hydroxide, potassium hydroxide, sodium methylate, benzyltrimetylammonium hydroxide and the like.

Illustrating the invention are the following examples, which, however, are not to be construed as limiting the invention to their details. All parts and percentages in the examples, as well as throughout this specification, are by weight unless otherwise specified.

EXAMPLE 1

An oil composition comprising 900 parts of acrylonitrile, 2,100 parts of vinylidene chloride, 15 parts of divinylbenzene, 500 parts of isobutane and 15 parts of diisopropyle peroxydicarbonate is prepared.

Besides, an aqueous composition comprising 6,300 parts of deionized water, 1,390 parts of colloidal silica dispersion (20 percent solid), 30 parts of aqueous solution of potassium dichromate (2.5 percent), 90 parts of aqueous solution of a condensation product of diethanolamine and adipic acid (10 percent) is prepared and adjusted at pH 4 with HCl.

After mixing the above oil composition and the aqueous composition under revolution of 10,000 rpm for 60 seconds, the mixture is charged into a 15 litter autoclave filled with nitrogen, and then reacted for 20 hours at 50° C. under 3.5 to 4.5 $Kg/cm^2$.

The reaction product is a pale yellow liquid having a viscosity of 210 cps at a room temperature. A cake containing 31 percent moisture and a microsphere having an average diameter of 13μ is obtained by repeating filtration and washing of the reaction product. Analyzing the cake by gas chromatography using DMF as a solvent, 1900 ppm of acrylonitriles are detected in the cake.

EXAMPLE 2

After the cake of Example 1 is dispersed into the same amount of deionized water, and adjusted to pH 9.5 by sodium hydroxide, the resultant dispersion is charged into 1 litter autoclave together with an agent for cyanoethylation as indicated in Table 1. Amount of the agent is 1.5 equivalents of the acrylonitrile remaining in the cake. The cyanoethylation is carried out for one hour at 50° C. at 4.8 $Kg/cm^2$ under blanket of nitrogen to give cakes similar to the cake of Example 1.

The amount of the acrylonitrile remaining in the cakes of Example 2 are shown in Table 1.

TABLE 1

| Agent to be used for cyanoethylation | remaining[1] acrylonitrile (ppm) | moisture[2] (%) | particle[3] size (μ) |
|---|---|---|---|
| monomethylamine | 0 | 30.3 | 13.6 |
| ethylamine | 75 | 31.9 | 14.1 |
| butylamine | 168 | 32.6 | 13.5 |
| ammonia | 260 | 30.4 | 12.8 |
| monoethanolamine | 12 | 32.3 | 13.6 |
| hydroxylamine hydrochloride | 420 | 29.8 | 14.0 |
| hydrazine sulfate | 583 | 27.6 | 15.0 |
| urea | 791 | 34.0 | 13.7 |
| methanol | 299 | 32.1 | 12.7 |
| butanol | 311 | 34.4 | 13.5 |
| ethylene glycol | 326 | 35.1 | 14.1 |
| polyethylene glycol (MW 200) | 306 | 33.3 | 16.3 |
| acetoxime | 676 | 28.6 | 14.2 |
| succinimide | 1116 | 29.3 | 14.5 |
| n-butyl aldehyde | 976 | 29.8 | 14.8 |
| sodium sulfide | 113 | 31.0 | 13.1 |

TABLE 1-continued

| Agent to be used for cyanoethylation | remaining[1] acrylonitrile (ppm) | moisture[2] (%) | particle[3] size (μ) |
|---|---|---|---|
| Blank | 1900 | 31.0 | 13.0 |

[1] remaining acrylonitrile: detected by the same process in Example 1
[2] moisture: determined by Karl Fischer method
[3] particle size: referred to the particle size of greatest frequency, profiling the distribution curves of 0.1 percent aqueous dispersion of the microsphere by a Coulter Counter

EXAMPLE 3

Oil composition containing 710 parts of acrylonitrile, 1800 parts of vinylidene chloride, 90 parts of butyl acrylate, 15 parts of trimethylolpropane trimethacrylate, 560 parts of isobutane and 15 parts of di-isopropyl peroxydicarbonate are mixed with the aqueous composition as described in Example 1 at 10,000 rpm to give a mixture. The mixture is charged into a 15 litter autoclave replaced with nitrogen gas and allowed to react for 10 hours at 4–5 Kg/cm² at 45° C. A part of the reaction product is taken out from the autoclave, filtered and washed in the same manner as described in Example 1 to give a cake (A).

Into the autoclave containing the rest of the reaction product, 50 parts of monoethanolamine is charged and the content is subjected to a cyanoethylation for 1.5 hours at 50° C. at 6 Kg/cm² under a nitrogen blanket, filtered and washed to give a cake (B).

Amounts of the remaining acrylonitrile, the moisture and particle size of microsphere in the cakes (A) and (B) are determined respectively.

The result is shown in Table 2.

TABLE 2

| | content of acrylonitrile (ppm) | moisture (%) | particle size (μ) |
|---|---|---|---|
| cake (A) (before cyanoethylation) | 2200 | 27 | 15.2 |
| cake (B) (after cyanoethylation) | 30 | 24 | 15.5 |

What is claimed is:

1. A process for preparing a thermo-expandable microsphere substantially free of acrylonitrile monomer which comprises microencapsulating a blowing agent with a thermoplastic polymer having an acrylonitrile moiety as one of ingredients, wherein the blowing agent becomes gaseous below a softening temperature of the thermoplastic polymer, and subjecting the microencapsulated product to cyanoethylation to eliminate the acrylonitrile monomer remaining in the microencapsulated product.

2. The process according to claim 1, wherein the thermoplastic polymer contains at least 15 percent by weight of the acrylonitrile moiety.

3. The process according to claim 1, wherein the thermoplastic polymer contains at least 15 percent by weight of the acrylonitrile moiety, 30 to 80 percent by weight of a vinylidene chloride moiety and 0.1 to 1.0 percent by weight of a cross-linkable vinyl monomer moiety.

4. The process according to claim 1, wherein the cyanoethylation is carried out at 30° to 80° C. under 2 to 10 Kg/cm².

5. The process according to claim 1, wherein the cyanoethylation is effected using a compound selected from the group consisting of primary amine, secondary amine, primary alkanolamine, secondary alkanolamine, secondary alkylalkanolamine and sodium sulfide.

* * * * *